(12) United States Patent
Alicherry et al.

(10) Patent No.: US 7,693,422 B2
(45) Date of Patent: Apr. 6, 2010

(54) CONSTRAINT-BASED DESIGN OF OPTICAL TRANSMISSION SYSTEMS

(75) Inventors: Mansoor Ali Khan Alicherry, Scotch Plains, NJ (US); Harsha S. Nagesh, Berkeley Heights, NJ (US); Chitra A. Phadke, Basking Ridge, NJ (US); Viswanath Poosala, Middlesex, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1590 days.

(21) Appl. No.: 10/952,015

(22) Filed: Sep. 28, 2004

(65) Prior Publication Data

US 2006/0067702 A1  Mar. 30, 2006

(51) Int. Cl.
  *H04B 10/20* (2006.01)
(52) U.S. Cl. .......................... 398/58; 398/59
(58) Field of Classification Search ............... 398/2, 398/58, 59; 370/254, 255
See application file for complete search history.

(56) References Cited

U.S. PATENT DOCUMENTS

| | | | |
|---|---|---|---|
| 6,842,723 B2 * | 1/2005 | Alicherry et al. ................ 703/2 |
| 2002/0036988 A1 * | 3/2002 | Cardwell et al. ............. 370/238 |
| 2003/0099014 A1 * | 5/2003 | Egner et al. .................. 359/124 |
| 2004/0008929 A1 * | 1/2004 | Ng et al. ........................ 385/24 |

OTHER PUBLICATIONS

S. Clavenna, "40-Gig Forecast," www.lightreading.com, Light Reading, pp. 1-32, May 2001.

(Continued)

*Primary Examiner*—Dalzid Singh
(74) *Attorney, Agent, or Firm*—Ryan, Mason & Lewis, LLP

(57) ABSTRACT

Techniques are disclosed for designing optical transmission systems that efficiently compute cost-optimal configurations under one or more constraints. For example, in one aspect of the present invention, a technique for designing an optical transmission system comprises the following steps/operations. A set of one or more demands and a set of optical transmission system elements are obtained. Elements may be consecutively coupled via a span. At least one constraint on the design of the optical transmission system is obtained. The at least one constraint comprises: (i) a signal loss in a span should not exceed a given maximum signal loss; (ii) a signal loss in a span should not exceed a given maximum signal loss and a span should be longer than a given minimum span length; (iii) a signal loss in a span should not exceed a given first maximum signal loss and a span should be longer than a given minimum span length, however, at most one in m contiguous spans can have a loss up to a given second maximum signal loss, wherein the second maximum signal loss is greater than the first maximum signal loss; or (iv) a signal loss in a span should not exceed a given maximum signal loss and a span should be longer than a given minimum span length, and an average span loss of any m consecutive spans should not exceed a given average loss, wherein the average loss is less than the given maximum signal loss. A least-cost configuration is then computed for the optical transmission system based on at least a portion of the set of one or more demands and the set of one or more optical transmission system elements such that the at least one constraint is satisfied.

14 Claims, 12 Drawing Sheets

OTHER PUBLICATIONS

H. Zang et al., "A Review of Routing and Wavelength Assignment Approaches for Wavelength-Routed Optical WDM Networks," SPIE, Optical Networks Magazine, vol. 1, No. 1, pp. 47-60, Jan. 2000.

O. Hauser et al., "Capacity Design of Fast Path Restorable Optical Networks," INFOCOM, 10 pages, 2002.

B. Ramamurthy et al., "Wavelength Conversion in WDM Networking," IEEE Journal on Selected Areas in Communications, vol. 16, No. 7, Sep. 1998.

B. Mukherjee et al., "Some Principles for Designing a Wide-Area WDM Optical Network," INFOCOM, pp. 2-26, Jun. 1994.

M.A.K. Alicherry et al, "Optimal Configuration of Optical Line Systems Under Various Constraints," ECOC, 2 pages, Sep. 2002.

B. Ramamurthy, et al., "Minimizing the Number of Optical Amplifiers Needed to Support a Multi-Wavelength Optical LAN/MAN," INFOCOM, 8 pages, 1997.

* cited by examiner

TABLE I

NUMBER OF VALID CONFIGURATIONS

| NO. OF HUTS | POSSIBLE CONFIGURATIONS | NO. OF VALID CONFIGURATIONS | | |
|---|---|---|---|---|
| | | Max, Min-Max | Max_m | Avg |
| 5 | 54 | 16 | 28 | 29 |
| 10 | 13122 | 256 | 656 | 800 |
| 15 | 3188646 | 4096 | 17792 | 22560 |
| 20 | 774840978 | 139264 | 780544 | 1082880 |

```
Algorithm 1: Algorithm Greedy-Max for Max n = Number of huts
start = 1
while (start ≠ n) {
    end = start + 1
    while (end ≠ n && d_{start,end} ≤ max_d)
        end++
    Place splices at H_i, ∀i start < i < end
    Place amplifier at H_end
    start = end
}
```

```
Algorithm 2: Algorithm DP-Min-Max for Min-Max ca(1) = 0  // end-terminal in H_1
for j = 2,..., n
    for all i such that d_{i,j} < max_d
        cs(j,i) = cs(j - 1, i)  // (case b)
    cs(j, j - 1) = ca(j - 1)  // (case b)
    ca(j) = min[min_i(cs(j - 1, i) + c_{i,j}), ca(j - 1) +
    c_{j-1,j}]  // (case a)
    where c_{i,j} = (
        if min_d > d_{i,j} or max_d < d_{i,j}: ∞
        else: least cost of amplifier required for d_{i,j})
    if None of cs(j, i) or ca(j) is defined
        No solution exists.
Solution = ca(n)
```

FIG. 10

*Algorithm 3:* Algorithm DP-Max_m for Max_m for $k = 1,\ldots, m$
    $ca(1, k) = 0$ // put end-terminal in $H_1$
for $j = 2,\ldots, n$
    if $(d_{j-1, j} > max\_d_h)$
        No solution exists Place a splice at $H_j$ for the following cases. The brackets contain the resulting configuration. The cost of the configuration stays the same.

1) For each $Cs(j - 1, k, i)$ with
    $d_{i,j} < max\_d_l$ $[Cs(j, k, i)]$
    2) For each $Cs(j - 1; m, i)$ with
    $d_{i,j} < max\_d_h$ $[Cs(j, m, i)]$
    3) For each $Ca(j - 1, k)$ with
    $d_{j-1,j} < max\_d_l$ $[Cs(j, k, j - 1)]$
    4) For each $Ca(j - 1, m)$ with
    $d_{j-1,j} < max\_d_h$ $[Cs(j, m, j - 1)]$ Place an amplifier at $H_j$ for the following cases and select the cheapest one.

5) For each $Cs(j - 1, k, i)$ with $min\_d \leq d_{i,j} \leq max\_d_l$ and
    6) For each $Ca(j - 1, k)$ with $(min\_d \leq d_{j-1,j} \leq max\_d_l)$
        If $(k < m)$, update $ca(j, k + 1)$ if this has
        lower cost. // $k + 1$ because extra loss span
        has shifted by 1 span
        If $(k = m)$, update $ca(j, m)$ // because we
        keep the configurations with $k > m$ in $k = m$
    7) For each $Cs(j - 1, m, i)$ with $max\_d_l < d_{i,j} \leq max\_d_h$ and
    8) For each $Ca(j - 1, m)$ with $(max\_d_l < d_{j-1,j} \leq max\_d_h)$
        update $ca(j, 1)$ if this has lower cost. // $k = 1$
        because extra loss span is being constructed if None of $Cs(j, k, i)$s or $Ca(j, k)$ is defined
        No solutions exists.
Solution = $min_k(ca(n,k))$

FIG. 12

| Algorithm 4: Algorithm DP-Avg for Avg |
|---|
| For $i = 1,..., n - 1$
    $L_i^1$ = List of configuration starting from $H_i$ having 1 span
For $j = 2,..., m - 1$
    For $i = 1,..., n - 1$
        Form $L_i^j$ by combining configuration $C_{i,k}$ from
        $L_i^{j-1}$ and configurations from $L_k^1$
For $i = 1,..., m - 1$
    For each of the Configuration $C_{1,k}$ in $L_1^i$
        Find the cost of $C_{1,k}$
        prev($C_{1,k}$) = null
        totalCost($C_{1,k}$) = cost of $C_{1,k}$
        Add $C_{1,k}$ to $E_k$ with its cost.
For $j = 2,..., n - 1$
    For each of the Configuration $C_{j,k}$ in $L_j^{m-1}$
        totalCost($C_{j,k}$) = ∞
        For each of the Configuration $C_{i,j}$ in $E_j$
            if ($C_{i,j}$ and $C_{j,k}$ can be combined together)
                tmp = totalCost($C_{i,j}$) + cost of $C_{j,k}$
                if (totalCost($C_{j,k}$) > tmp)
                      totalCost($C_{j,k}$) = tmp;
                      prev($C_{j,k}$) = $C_{i,j}$
    Add $C_{j,k}$ to $E_k$ with its cost.
Optimal solution is the least cost solution in $E_n$ |

TABLE II
EXPERIMENTAL SETTINGS

| | |
|---|---|
| Greedy-Max | $max\_d = 120$ |
| DP-Min-Max | $max\_d = 120$, $min\_d = 40$ |
| DP-Max_m | $min\_d = 40$, $m = 4$, $max\_d_l = 120$ $max\_d_h = 150$ |
| DP-Avg | $max\_d = 150$, $min\_d = 40$, $m = 4$ $avg\_d = 120$ |

FIG. 18
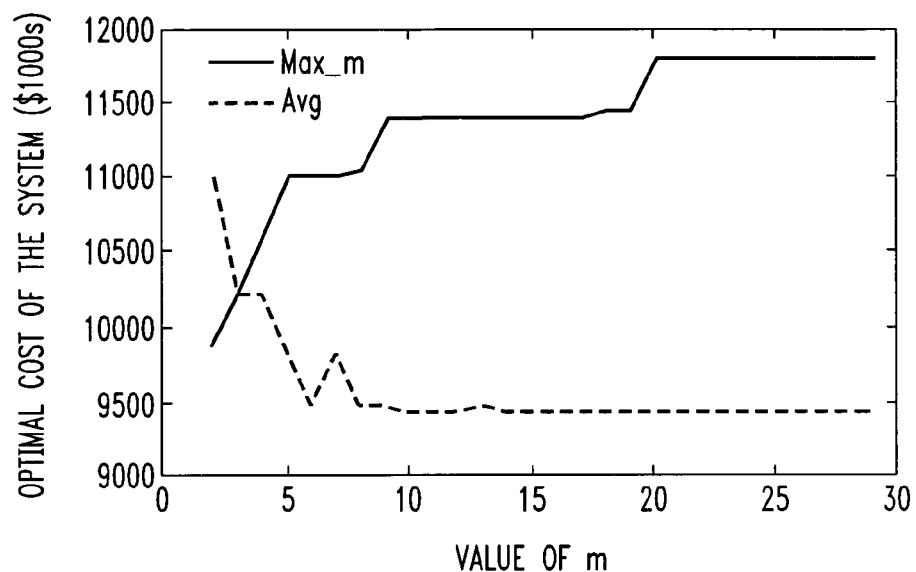
FIG. 19
TABLE III
SUMMARY OF REAL NETWORK DESIGN
|            | TIME (ms) | COST        |
|------------|-----------|-------------|
| Greedy-Max | 4         | $6,756,000  |
| DP-Min-Max | 30        | $6,756,000  |
| DP-Max_m   | 44        | $5,968,000  |
| DP-Avg     | 201       | $5,574,000  |
FIG. 20
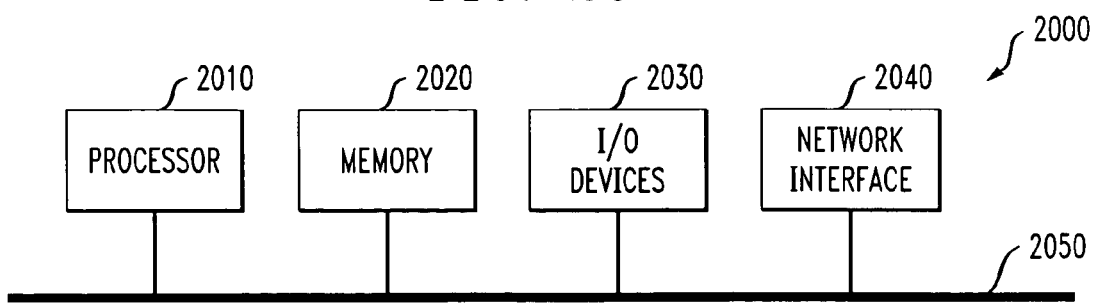

CONSTRAINT-BASED DESIGN OF OPTICAL TRANSMISSION SYSTEMS

FIELD OF THE INVENTION

The present invention relates to optical transmission systems and, more particularly, to techniques for designing optical transmission systems that efficiently compute cost-optimal configurations under one or more constraints.

BACKGROUND OF THE INVENTION

Over the last several years, there has been a tremendous growth in data traffic spurred primarily by the World Wide Web. This growth has posed a great need for large amounts of bandwidth. At the same time, revenues from the data traffic have not been growing as fast, causing carriers to look for the cheapest possible deployments. It is now clear that optical networks more than satisfactorily satisfy these needs by providing large amounts of bandwidth over a single fiber.

Since the 1980's, optical networks have been the primary point-to-point transmission links in a voice or data network. Here, traffic is converted into light at the source, transmitted through fiber over large distances, and converted back to the electrical domain at the destination. If the distance between the source and the destination is too high, the signal may have to be regenerated through an optical-electrical-optical (OEO) conversion along the way. Often, these systems are deployed as links in ring topologies carrying Synchronous Optical Network (SONET) signals, with each ring consisting of two or four fibers for protection. However, as traffic grows, a single ring quickly becomes insufficient and multiple SONET rings are stacked on top of each other to support growing traffic. This solution is not economically scalable because each ring of fibers requires its own transmission system equipment.

Dense Wave Division Multiplexing (DWDM) technology addressed this problem by enabling the transmission of multiple wavelengths (up to 128 currently) on a single fiber. Also, new amplification technologies like Erbium Doped Fiber Amplifiers (EDFAs) and Raman pumps supported lumped amplification of a large spectrum of wavelengths and increased the reach of the signal. Together, these technologies allowed multiple traffic flows over a single strand of fiber using a common set of equipment, whether they are SONET signals or Gigabit Ethernet (GigE) channels or Multi-Protocol Label Switched (MPLS) tunnels. Further, they allowed the signal to go far without expensive OEO conversions. This dramatically reduced the costs of the networks while increasing their reach.

All of these advances in transmission technologies bring in a new set of issues. The modern transmission systems obtained high capacity and long reach by exploiting the physics of transmission media to the extreme. This has made them expensive and quite sensitive to fiber impairments. As a result, while designing an optical network for deployment, one has to select the amplification equipment carefully to guarantee error-free propagation of signal. Also, it is critical to minimize the costs associated with a transmission system deployment because these systems typically contribute the most to the overall cost of a network. Given a variety of amplifiers with varying costs and amplification strengths, the modern network designer has plenty of design choices.

Although optical network design has been an active area of research, most of the existing studies have focused on designing ring and mesh networks which contain optical transmission systems as links. They treat the links as black-boxes with simple cost functions and do not suggest the amplifiers that need to be placed on the links. Even where link cost was considered in the design, the cost was mostly a linear function of distance and was not derived from an accurate link design.

Accordingly, improved optical network design techniques are needed.

SUMMARY OF THE INVENTION

The present invention provides techniques for designing optical transmission systems that efficiently compute cost-optimal configurations under one or more constraints.

For example, in one aspect of the present invention, a technique for designing an optical transmission system comprises the following steps/operations. A set of one or more demands and a set of optical transmission system elements are obtained. Elements may be consecutively coupled via a span. At least one constraint on the design of the optical transmission system is obtained. The at least one constraint comprises: (i) a signal loss in a span should not exceed a given maximum signal loss; (ii) a signal loss in a span should not exceed a given maximum signal loss and a span should be longer than a given minimum span length; (iii) a signal loss in a span should not exceed a given first maximum signal loss and a span should be longer than a given minimum span length, however, at most one in m contiguous spans can have a loss up to a given second maximum signal loss, wherein the second maximum signal loss is greater than the first maximum signal loss; or (iv) a signal loss in a span should not exceed a given maximum signal loss and a span should be longer than a given minimum span length, and an average span loss of any m consecutive spans should not exceed a given average loss, wherein the average loss is less than the given maximum signal loss. A least-cost configuration is then computed for the optical transmission system based on at least a portion of the set of one or more demands and the set of one or more optical transmission system elements such that the at least one constraint is satisfied.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 10 is a diagram illustrating a third OTS design algorithm;

FIG. 12 is a diagram illustrating a fourth OTS design algorithm;

FIGS. 13 through 19 are diagrams for use in illustrating experimental results; and FIG. 20 is a diagram illustrating a computer system suitable for implementing an OTS design system.

DETAILED DESCRIPTION OF PREFERRED EMBODIMENTS

Figure 1:
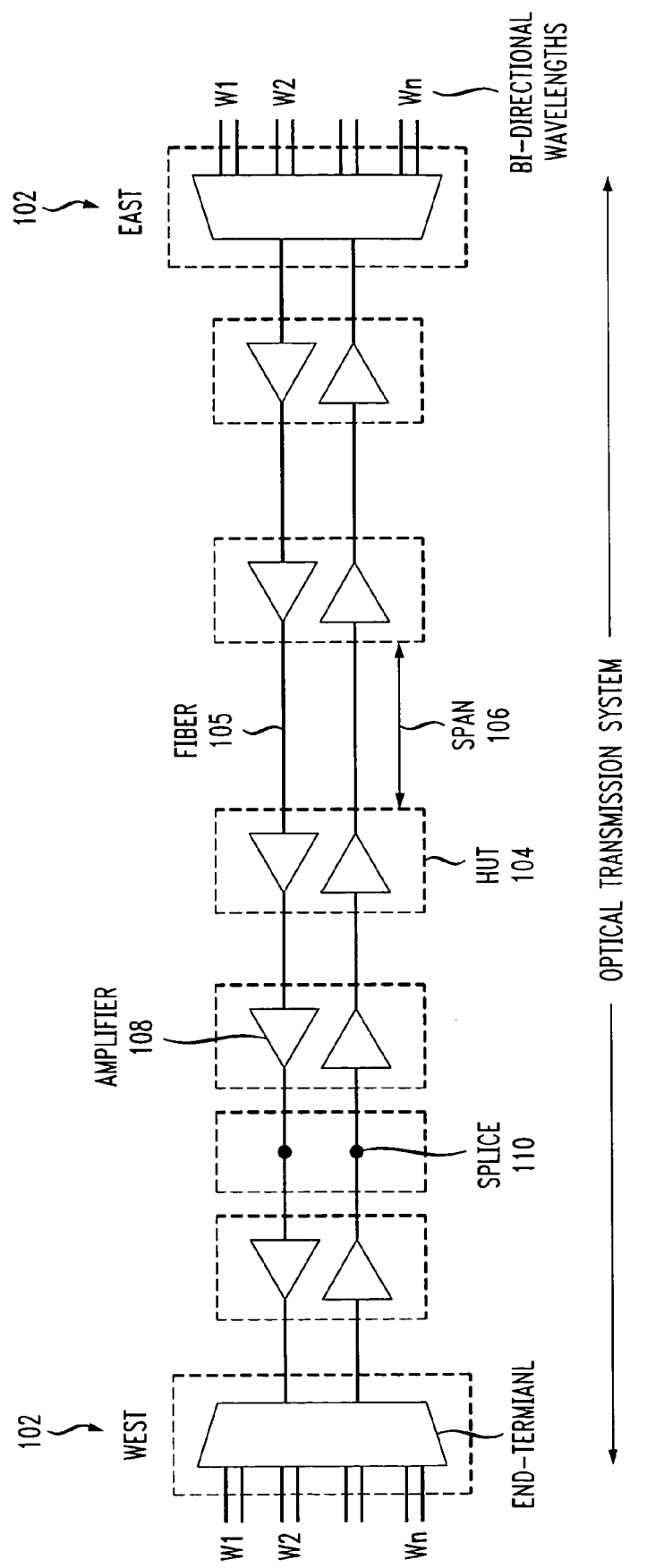
FIG. 1 is a diagram illustrating an optical transmission system.

The following description will illustrate the invention in the context of an exemplary optical network. It should be understood, however, that the invention is not necessarily limited to use with any particular type of network. The invention is instead more generally applicable to any environment in which it is desirable to design transmission systems that efficiently compute cost-optimal configurations under one or more constraints. Thus, by way of example only, the techniques of the invention may be applied to optical networks, asynchronous transfer mode (ATM) networks, Internet Protocol (IP) networks, GigE networks, etc.

As previously mentioned, the last decade has witnessed wide scale deployment of optical networks to support the growing data traffic. This success can be traced back to advances in optical transmission systems such as DWDM, Raman amplification, etc., which allow a single fiber to carry several wavelengths very far, while sharing expensive equipment. However, these cutting edge technologies require careful placement of amplifiers and other network elements to ensure error-free propagation of the signal and to minimize costs.

A set of constraints may be used to ensure valid configurations for deployment. However, it is non-trivial to identify the optimal configuration under all but the simplest constraints. In accordance with principles of the invention, we consider a set of constraints with varying flexibilities and present algorithms for efficiently computing the cost-optimal configuration under them. We also present experimental and theoretical results to evaluate the various constraints and algorithms.

The remainder of the detailed description is organized as follows. In Section I, we present an introduction to issues and principles of the present invention. Section II contains an overview of relevant DWDM technologies and describes a general transmission system. In Section III, we formulate the constraints considered and state the optimization problems. Then, we present the design algorithms in Section IV followed by experimental results in Section V. Section VI discusses related design problems arising in practice. Finally, Section VII describes an illustrative hardware implementation.

I. Introduction

There are two fundamentally different approaches for designing transmission systems. In the first approach, which we call model-based design, a mathematical model of the signal and noise characteristics of various equipment and fiber is derived, and an optimization problem that minimizes the cost of the deployment while limiting the loss is solved. This approach, however, is limited by the accuracy of the modeling, which is hard to achieve in practice without getting very complicated. In the second approach, which we call constraint-based design, optics experts can use detailed simulation of the transmission system to come out with a set of constraints (also called engineering rules), which are guidelines for designing the system. The idea is that any design derived subject to these constraints is guaranteed to work in practice. There can in fact be different constraints with different levels of flexibility—with the more flexible rules leading to cheaper deployments. For example, one rule may require that the distance between two amplifier locations should not exceed 50 kilometers, while another rule may allow the violation of this rule at most three times.

While there is much potential to the model-based design approach, the existing models of modern optical systems are still not reliable enough for actual deployment and also take much time to find the optimal solution. As a result, it is preferred to employ the constraint-based design approach in practice. Thus, the present invention focuses on the constraint-based design approach.

Given a set of constraints, the next step is to identify the cost-optimal placement of the correct set of network elements (called a configuration), while obeying those constraints. This is often non-trivial in practice because of the number of potential configurations and the difficulty in even enumerating them. It is also important to understand the relative flexibilities of the constraints while choosing the set of constraints for a transmission system. These two issues are addressed in accordance with principles of the present invention. More particularly, as will be illustratively described herein, the invention provides:

Formulation of a canonical set of practical constraints with a wide range of flexibility;

Efficient algorithms for the optimal configuration of transmission systems under the above constraints;

Theoretical results capturing the relationship between some of the constraints; and Experimental results derived from synthetic and real-life data sets which show the effectiveness of the algorithms as well as the costs incurred due to the various constraints.

II. Preliminaries

At the optical layer, a traffic flow from the higher protocol layers (IP, ATM, GigE, SONET, etc.) is converted into a light signal of specific wavelength and transmitted over fiber connecting the source location to the destination. For a more detailed discussion of these general concepts, see, e.g., R. Ramaswami et al., "Optical Networks: A Practical Perspective," Morgan Kaufmann, San Francisco, 1998, the disclosure of which is incorporated by reference herein. An optical transmission system (OTS) is the entire set of equipment responsible for this transmission.

FIG. 1 depicts a schematic of an illustrative OTS. It is usually a linear 2-fiber system connecting the two locations in both directions ("east-west and west-east"), with no switching or routing of signals. This is changing with the introduction of all-optical mesh networks, where a transmission system can be deployed as a mesh network with switching capabilities in the optical add-drop multiplexers. The end nodes of OTS 100, called end-terminals (ET) 102, contain transmit and receive devices. These devices convert each wavelength from electrical to optical (at the source) and optical to electrical (at the destination) domains. They are also responsible for multiplexing individual wavelengths onto the DWDM channel and demultiplexing them. Along the link, the OTS contains various signal enhancement elements, which are well known.

Some systems may also contain devices called wavelength add-drop multiplexers to add or drop a subset of the wavelengths along the way. The locations containing the intermediate network elements are called huts 104 and the fiber link 105 between any two locations (including end-nodes) is called a span 106. Spans in an OTS are not always of the same length because huts are usually chosen based on costs, e.g., towns with low rents.

As the signal travels over the fiber, it undergoes unwanted transformations, slowly losing its fidelity. There are several reasons for this, including imperfections in the fibers, chromatic dispersion, polarization mode dispersion, amplified spontaneous emission (ASE), etc. The net effect is that the signal power (measured in dB) gradually drops while the noise power increases. The amount of loss varies with fiber type, distance traveled, length, number of wavelengths, and signal bandwidth. For example, a 64-channel OC-48 (2.5 G) signal over 100 km will incur less loss than an 80-channel OC-192 (10 G) signal over 200 km of the same fiber. It is critical that the signal power be above a minimum value at the destination node, in order to extract the data with acceptable bit error rates (BER). Another related measure for the quality of the signal is the optical signal to noise ratio (OSNR). It is also important that the OSNR stay above a certain threshold in order to limit BER.

Since signal loss is unavoidable in practice, optical transmission systems deploy various network elements in some of the huts to improve signal quality. The most important of them are (optical) amplifiers 108, also called repeaters, which boost the power of the signal by a specific amount.

Figure 2:
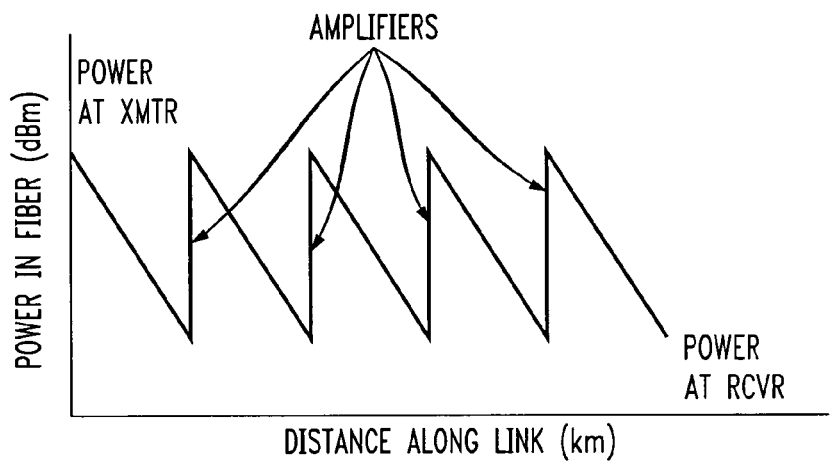
FIG. 2 is a diagram illustrating power levels in a fiber.

FIG. 2 illustrates the behavior of a signal through a typical fiber with intermediate amplifiers. It shows the signal level gradually falling before being brought up to the original level at the amplifier. The destination node also has an amplifier to finally bring the signal back to the required level.

There are a few different types of amplifiers with different maximum amplification strengths. The notable among modern amplifiers are Erbium Doped Fiber Amplifiers (EDFAs) and Raman pumps. Interestingly, Raman pumps (and the modern generation EDFAs which also involve Raman pumping) also need a minimum length fiber to be effective because they employ distributed amplification that operates over the fiber length.

On the negative side, all amplifiers boost the noise along with the signal. As a result, the OSNR drops along the link and the signal becomes invalid after some distance. This places a limit on the reach of a transmission system (anywhere from a few kilometers to few thousands) after which the signal is converted back to the electrical domain and put back on another OTS.

Finally, in some of the closely-spaced huts, there may not be a need to place an amplifier at all because of the low signal losses. In such huts, the fibers are simply joined together using a passive element called a splice 110. Although splices introduce a small additional loss in optical signal power, they reduce the number of amplifiers and hence yield huge cost savings.

III. Problem Description

In this section, we introduce a framework for designing optical transmission systems and state the problems to solve. First, we present some definitions.

We illustratively use the phrase "optical transmission system" to generally refer to the set of amplifier types and transmission technologies. Such a set of amplifier types and transmission technologies may typically constitute a product offering. We illustratively define the placement of various amplifiers and splices for a given deployment as a "configuration" of the transmission system and illustratively call it "valid" if the deployed system can propagate the signal with at least the required minimum power. For example, a valid configuration may be getting the signal back to its original power after each span (e.g., as in FIG. 2). For the purpose of this illustrative description, we define the "cost" of a configuration as the sum of the costs of the amplifiers and ignore the costs of the end-terminals and splices. A precise definition of a configuration is as follows.

Definition 1: Let H be a set of huts which include the two end-nodes. Let A be the set of amplifier types associated with a transmission system and s denote a splice. Then, a configuration C of the transmission system between the two end terminals is defined as a mapping H→(A∪s), which specifies the network element (amplifier or splice) to be placed in each hut.

Figure 3:
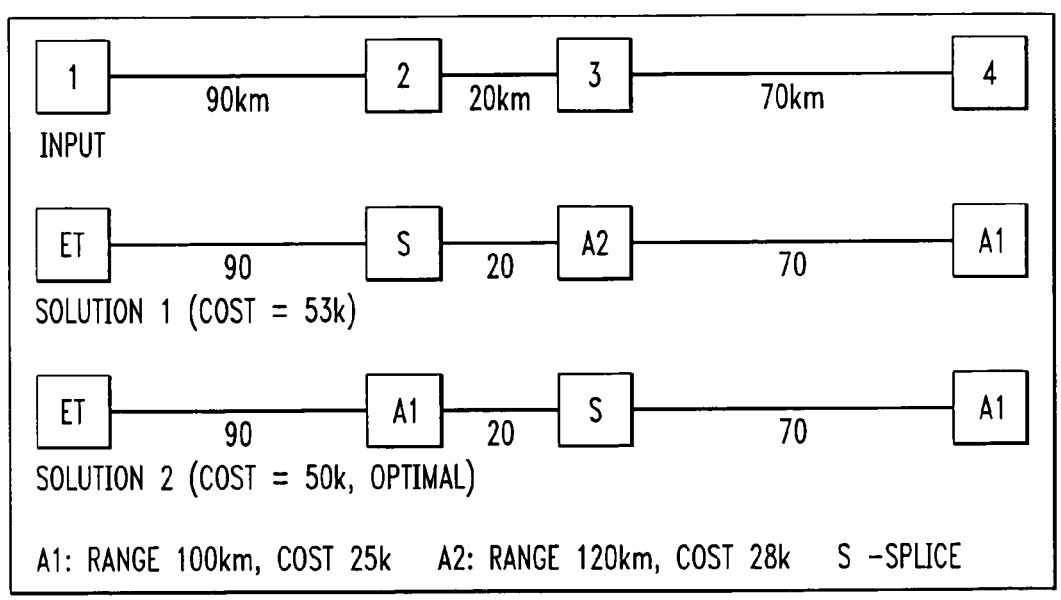
FIG. 3 is a diagram illustrating two valid configurations for the same hut configurations.

Due to the availability of splices and different amplifiers, it is possible to have multiple valid configurations for a given input. FIG. 3 shows one such case where two valid configurations are given for the same hut distribution. Here, $A_1$ and $A_2$ are two different amplifier types, with different costs and amplification strengths (represented by the maximum distance they can compensate for).

Typically, the fiber and huts have already been chosen and it is the job of the network designer to deploy the cheapest valid configuration of a transmission system. Rarely, there are greenfield scenarios where the huts and fiber are also to be chosen. This is discussed below. Also, we initially focus on the configuration of the system in a single direction and present the solution for the bi-directional scenario.

Definition 2: Given a pair of end-nodes S and D, a set of huts, the fibers between them, and a set of amplifier types, identify the least-cost valid configuration of the transmission system for carrying a given set of traffic channels from S to D.

A naive solution is to generate all possible configurations, check their validity, and choose the cheapest valid configuration. The validity of a configuration can be checked using simulators that model the behavior of the optical channel at a fine granularity and generate the classic eye diagrams. But, the number of potential configurations can be huge—given n huts and k amplifier types, this number can be as high as $(k+1)^n$. Also, each simulation can take hours to complete, making this approach impractical.

Instead, an alternative approach may be taken in practice. There, one or more constraints; also called engineering rules, are first derived through simulation such that any configuration designed subject to these constraints is guaranteed to be valid. These constraints are derived assuming a fully loaded system, working for all wavelengths regardless of the wavelength assignment used in the system. We also call such configurations to be valid under that constraint. An example constraint is—the loss in no span should exceed 15 dB. The idea is that imposing these constraints will reduce the number of configurations to be considered, albeit at the cost of possibly leaving out a cheaper valid configuration.

For a given transmission system, one can formulate multiple types of constraints, each leading to valid configurations but varying in "strictness." For example, a strict rule may require that the signal return to its original strength after every hut, whereas a less strict rule may allow a small number of exceptions to this rule. It is easy to see that the less strict rule can lead to more potential configurations, possibly leading to a cheaper configuration. For example, consider a topology containing one span of 29 dB loss and all other spans having losses far less than 28 dB. Using an amplifier capable of amplifying by 28 dB, it might still be possible to configure this transmission system in reality because subsequent spans may compensate for the excess loss. However, this configuration would not be considered in the strict rule above. On the other hand, there may also be too many potential configurations under a less strict rule making it impractical to apply.

Based on a survey of various transmission system technologies and their design methodologies, the present invention provides the following representative constraints. Here, a "span" refers to the fiber link between two consecutive non-splice elements. These constraints also cover a wide range of strictness, enabling an interesting study of the design possibilities.

- Max: The loss in any span should not exceed max_loss dB. This is a constraint used for traditional amplifiers which can only compensate for so much loss, e.g., EDFA may only amplify by 20 dB. The maximum power among the available amplifiers is used as max_loss. These designs try to get the signal back to the original strength after each span.
- Min-Max: The loss in any span should not exceed max_loss dB and each span should be longer than min_d km. This arises in the context of distributed amplifiers like Raman pumps which need a minimum propagation distance to be effective. Clearly, a solution valid under Min-Max will also be valid under Max.
- Max-m: The loss in any span should not exceed $max\_loss_1$ dB and each span should be longer than min_d km; however, at most 1 in m contiguous spans can have a loss up-to $max\_loss_h$ which is greater than $max\_loss_1$. The idea here is that if the extra-loss spans are far enough apart, their excess losses can be compensated by the intermediate amplifiers. Note that this is more flexible for small values of m.
- Avg: The loss in any span should not exceed max-loss dB and each span should be longer than min_d km; and the average span loss of any m consecutive spans should not exceed avg_loss which is smaller than max_loss. In other words, the loss is averaged over a set of contiguous spans rather than being imposed on every single span. Note that this constraint gets more flexible for larger values of m.

Note that there may be cases where these constraints do not have any valid configurations at all. For example, for Min-Max, this happens when the distance between two adjacent huts, say, $H_1$ and $H_2$, is less than the minimum (hence can not place an amplifier at $H_2$) and the loss between $H_1$ and $H_3$ is greater than the maximum (hence can not place a splice at $H_2$).

To understand the relative flexibilities of these constraints, we enumerated all possible valid configurations under them for a test network. These configurations are computed independent of the amplifiers available, by simply enumerating all possible splice placements. The results are summarized in Table 1 of FIG. 4. The table also presents the total number of configurations when no constraint is applied. The Max and Min-Max constraints turned out to have the same number because every span in the input exceeded the minimum span length needed by Min-Max. We see that all of the constraints significantly reduce the number of configurations as compared to not applying any constraint. However, they still allow a large number of configurations, with Avg having the highest count followed by Max_m and then the others.

While the constraints are simple to state, it is non-trivial to find the optimal solution under them because: (a) the number of valid configurations can still be very high; and (b) even the methodology for enumerating all the valid configurations is not obvious. Hence, efficient algorithms are needed for finding the optimal solution under each of the constraints. Also, when deciding on the constraints for an OTS, it helps to know the design time versus cost tradeoffs between various constraints. For example, if two constraints lead to the same design time, it is better to choose the one that leads to the cheapest solution. These issues are the focus of the remainder of the detailed description.

IV. Illustrative Design Algorithms

Figures 4, 5, 6:
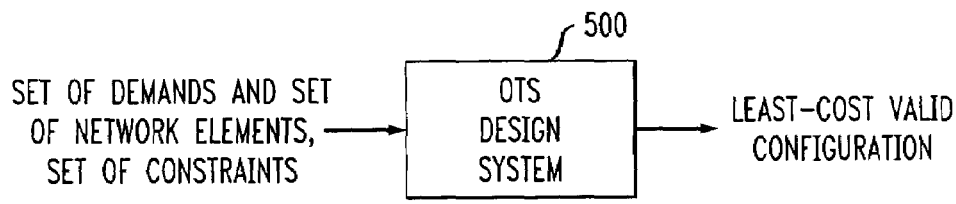
FIG. 4 is a diagram illustrating a table of valid configurations.
FIG. 5 is a diagram illustrating an optical transmission system (OTS) design system.
FIG. 6 is a diagram illustrating a first OTS design algorithm.

Before describing the illustrative design algorithms (methodologies), reference is made to FIG. 5. FIG. 5 is a block diagram illustrating an optical transmission system (OTS) design system for computing a least-cost valid configuration according to an embodiment of the present invention. In general, the design system 500 receives as input a given set of one or more traffic demands and a set of one or more network elements. The design system 500 also inputs the set of one or more constraints to be satisfied by the design. The design methodologies described herein are then employed to compute the least-cost valid configuration.

Design system 500 may be a standalone computation system or it may be operatively connected to one or more components of a network for which it is computing results. Results computed by design system 500 may be implemented automatically and/or manually so as to realize an efficiently designed network.

Turning now to the design methodologies of the invention, we now present algorithms for finding the optimal valid configuration under the constraints given in Section III above. First, we introduce some notation and state our assumptions.

Let $H=\{H_1, \ldots, H_n\}$ be the ordered set of huts from west to east, with $H_1$ and $H_n$ being the source and destination respectively. We call any contiguous set of spans a "segment" of the network. In a configured network, we use "span" to refer to the link between two huts containing amplifiers (i.e., splices are ignored). Let $A=\{A_1, \ldots, A_x\}$ be the set of available amplifier classes. The distance between two huts $H_i$ and $H_j$ is referred to as $d_{i,j}$. We use $c_{i,j}$ as the cost of an amplifier needed to compensate for a distance $d_{i,j}$. If there is no such amplifier, the cost is ∞. For the sake of simplicity, we ignore any losses introduced by the splices. In the discussions that follow, we use span length (or span distance) to be representative of span loss. In real networks, however, due to fiber aging and mixing of fibers, loss may not be proportional to span length. In such cases, an equivalent fiber length can be found for the corresponding measured fiber loss and used in the algorithms. We first focus on configuring a transmission system in a single direction and then extend the algorithms to the bi-directional case at the end of this section.

Next, we consider a simple instance of the design problem and present an efficient solution. Then, we show that this algorithm does not address the constraints at hand and present a set of dynamic-programming based solutions.

A. Algorithm Greedy-Max for Max with Single Class of Amplifiers

Here, the maximum distance (max_d) allowed between two amplifier huts is given. The idea is to start from the first hut $H_1$ and continue skipping huts until going any further would exceed max_d and place an amplifier there. This is repeated till the end hut $H_n$ is reached. The illustrative pseudo-code is given in Algorithm 1 in FIG. 6.

Since the algorithm visits each hut exactly once and decides its contents in constant time, its running time is O(n).

Unfortunately, the above algorithm fails in the presence of multiple amplifier classes. This can be illustrated using FIG. 3. That figure shows two solutions Solution 1 and Solution 2, with the latter being cheaper. However, Greedy-Max would lead to Solution 1, which is suboptimal.

Figures 7, 8:
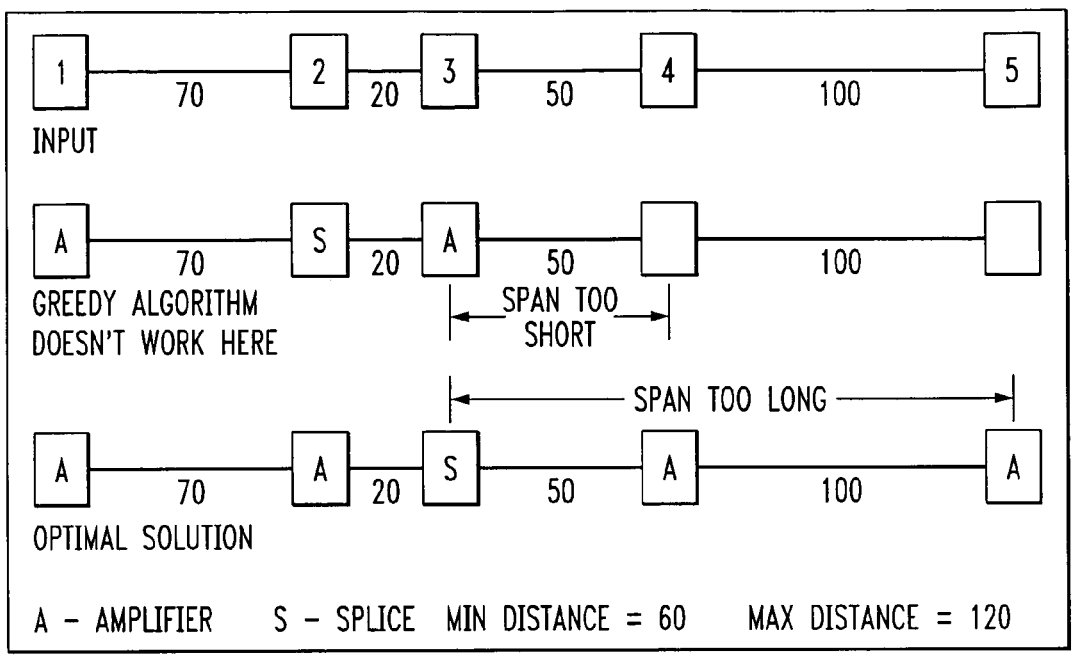
FIG. 7 is a diagram illustrating a case where a design algorithm fails.
FIG. 8 is a diagram illustrating a second OTS design algorithm.

The algorithm also fails for Min-Max, as shown in FIG. 7. Here, after placing an amplifier at hut $H_3$, the algorithm would not be able to place an amplifier at $H_4$ as the span length $d_{3,4}$ would fall below the minimum distance of 60. Neither can it place a splice at $H_4$ because the span length $d_{3,5}$ would exceed max_d. Thus, the algorithm fails to find a solution, while there is in fact an optimal solution for this case as shown in the figure.

Next, we present an algorithm for Min-Max. It is easy to see that it can be used for Max with multiple amplifier classes by choosing a value of zero for minimum distance.

All the algorithms we present henceforth are based on the well-known concept of dynamic programming, see, e.g., T. Cormen et al., "Introduction to Algorithms," MIT Press, 1990, the disclosure of which is incorporated by reference herein. In essence, all of the algorithms operate by finding a small number of optimal configurations for increasingly longer segments of the network using previously computed solutions. In the pseudo-code accompanying the algorithms, we only show the derivation of the cost of the optimal configuration. It is assumed that the configuration itself is kept track of along with the cost, as is commonly done in most dynamic programming algorithms.

B. Algorithm DP-Min-Max for Min-Max

Here, the maximum and minimum distances are given as max_d and min_d respectively. Note that we are using max_d in place of the max_loss in the constraint.

The basic idea is as follows. The huts are traversed from source to destination and increasingly longer solutions are built. At each hut $H_j$, the optimal solutions are computed from $H_1$ to $H_j$ under two cases: (a) assuming an amplifier is placed at $H_j$; and (b) assuming a splice is placed at $H_j$. We refer to the cost of the optimal configuration for case (a) as ca(j). This configuration is derived by considering all solutions up to $H_{j-1}$ with and without amplifiers at $H_{j-1}$ and adding an amplifier at $H_j$, and selecting the cheapest result. For case (b), let $H_k$ be the last hut before $H_j$ that has an amplifier. Then, we refer to the cost of the configuration for case (b) as cs(j, k). This configuration is also derived by extending the solutions up to $H_{j-1}$ with and without amplifiers at $H_{j-1}$. The illustrative pseudo-code is given in Algorithm 2 in FIG. 8.

Figure 9:
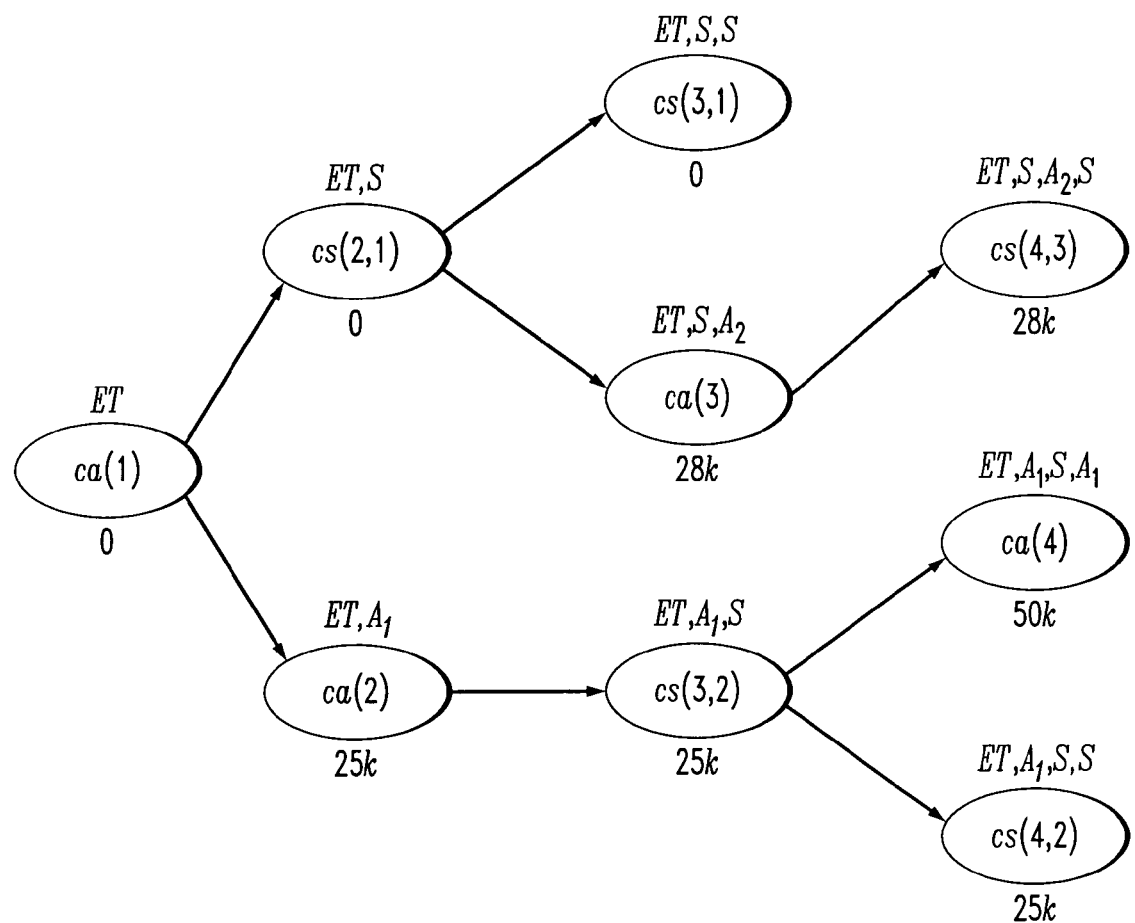
FIG. 9 is a diagram illustrating an example using the second OTS design algorithm.

We illustrate this algorithm for the problem given in FIG. 3 using FIG. 9. Let min_d be 60. The steps in the algorithm are as follows. C(i, j) represents the resulting configuration from hut $H_i$ to hut $H_j$.

1. Initializations ca(1)=0; C(1,1)=(ET)

2. j=2 cs(2,1)=ca(1)=0; C(1, 2)=(ET, S)

ca(2)=ca(1)+25k=25k; C(1, 2)=(ET, $A_1$)

3. j=3 cs(3, 1)=cs(2,1)=0; C(1, 3)=(ET, S, S)

cs(3, 2)=ca(2)=25k; C(1, 3)=(ET, $A_1$, S)

ca(3)=min(cs(2,1)+28k, ca(2)+∞)=28k;

C(1, 3)=(ET, S, $A_2$)

4. j=4 cs(4, 2)=cs(3, 2)=25k; C(1, 4)=(ET, $A_1$, S, S)

cs(4, 3)=ca (3)=28k; C(1, 4)=(ET, S, $A_2$, S)

ca(4)=min (cs(3,1)+∞, cs(3, 2)+25k, ca (3)+25k)=50k;

C(1, 4)=(ET, $A_1$, S, $A_1$)

5. (Optimal Solution) ca(4)=50k; C(1, 4)=(ET, $A_1$, S, $A_1$)

The complexity of the algorithm is determined by the number of sub-solutions. Computing minimum does not add to the complexity since we can keep track of minimum while we are computing the solutions. Let s be the maximum number of spans that can be spliced together in the input. Then:

Number of solutions $$\leq n(s+1)$$
$$\leq n\left(\frac{\max\_dist}{\min_{1 \leq i \leq n}(d_{i,i+1})} + 1\right)$$

Hence the complexity is O(ns).

Next, we derive an interesting relationship between Max and Min-Max. First, it is evident that a valid configuration under Min-Max will also be valid under Max, for the same values of max_d. It is intuitive and often the case that the solution under Min-Max is more expensive than that under the less stringent Max. However, they turn out to have the same cost in some circumstances as the following theorem states.

Theorem 1: Equivalence of Min-Max and Max: If there exists a valid configuration under Min-Max in the presence of a single amplifier type, then the cost of the optimal configuration under Min-Max is same as the optimal solution under max.

C. Algorithm DP-Max_m for Max_m

Recall that this constraint requires a maximum span distance (max_$d_l$), minimum distance (min_d), and allows one span out of every m consecutive spans to have a higher distance (max_$d_h$). We call such spans the extra-loss spans.

The basic idea is that we can generate solutions for $H_1 \ldots H_j$ from the solutions for $H_1 \ldots H_{j-1}$ knowing the nearest extra-loss span from $H_{j-1}$ in the latter. If that span is m or more spans away then we are allowed to travel higher distance in the span containing $H_j$.

Figure 11:
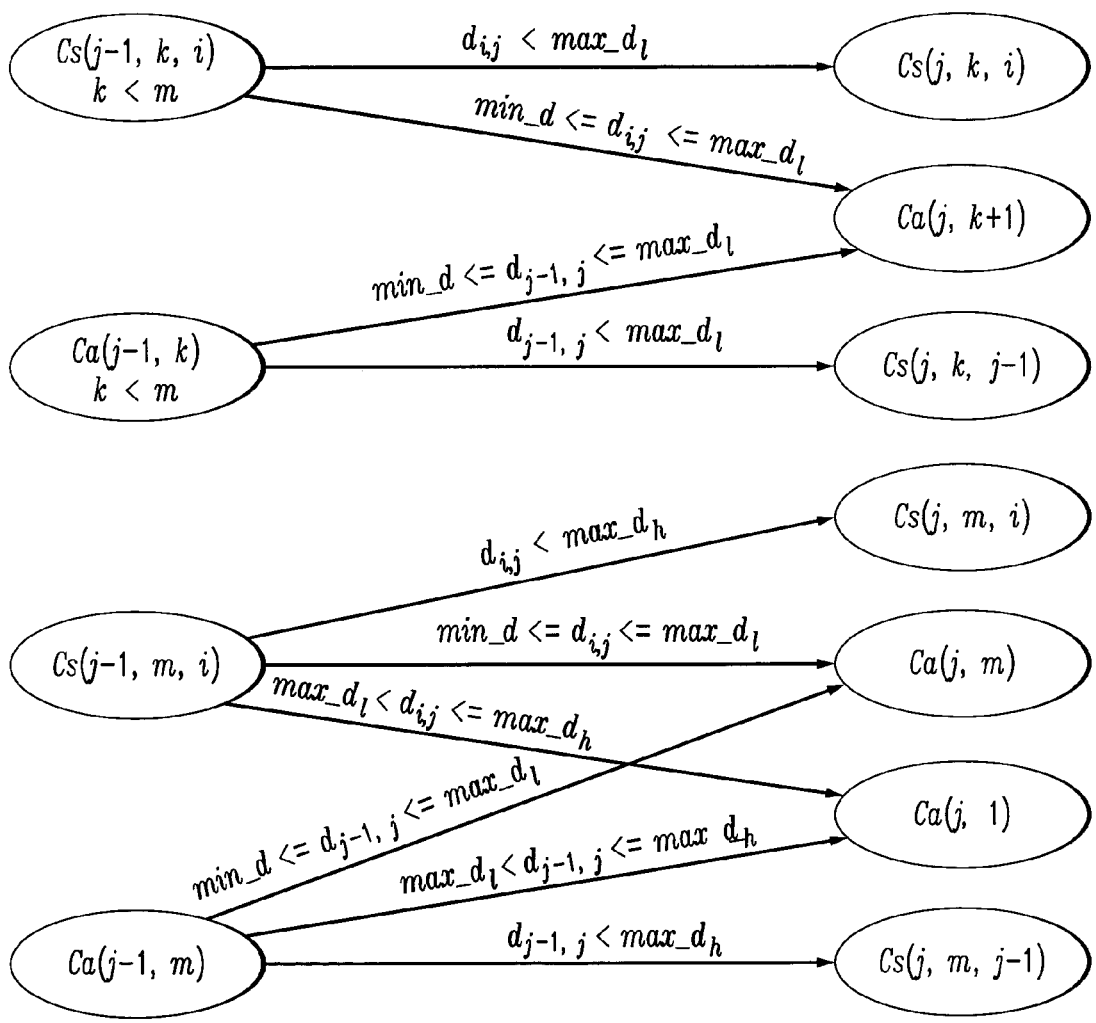
FIG. 11 is a diagram illustrating state transitions associated with the third OTS design algorithm.

Algorithm 3 in FIG. 10 presents the illustrative pseudo-code. We elaborate on the operations here. For a given hut $H_j$, for each k, $1 \leq k \leq m$, the optimal solutions are enumerated for $H_1 \ldots H_j$ for the cases where: (a) there is an amplifier at $H_j$; and (b) there is a splice at $H_j$, where k is the number of spans between $H_j$ and the nearest extra loss span before $H_j$. When counting k, the span containing $H_j$ is not considered if it has a splice. Also, if the nearest extra loss span is more than m spans away, k is taken as m. We refer to the configuration in case (a) as Ca(j, k) and its cost as ca(j, k). For case (b), let $H_i$ be the last hut before $H_j$ that has an amplifier. Then, we refer to the configuration in case (b) as Cs(j,k,i) and its cost as cs(j, k, i). State transitions for the algorithm are illustrated in FIG. 11.

There can be at most s×m configurations of the type Cs(j, k,i) for each j=2 . . . n and these are computed in constant time. For computing Ca(j, k) for each j=1 . . . n and k=1 . . . m, the algorithm refines the value of ca(j, k) at most s times and each refinement (min function) takes a constant time. Hence the complexity of the algorithm is O(nsm).

D. Algorithm DP-Avg for Avg

Recall that under this constraint, each span can have a maximum distance (max_d), a minimum distance (min_d), and the average distance of every m consecutive spans should not exceed avg_d, where avg_d<max_d.

The basic idea behind the algorithm is stated below. First, we present a key observation needed for the algorithm. Suppose we have two configurations $C_{i,j}$ and $C_{j,k}$ and we know the optimal solution $C_{i,j}$ for $H_1 \ldots H_j$ that includes $C_{i,j}$. Suppose we want to construct the optimal solution for $H_1 \ldots H_k$ that includes both $C_{i,j}$ and $C_{j,k}$. This can be built by simply combining $C_{1,j}$ and $C_{j,k}$, provided that: (a) $C_{i,j}$ and $C_{j,k}$ can be combined without violating Avg; and (b) there are at least m−1 spans in $C_{i,j}$ or i=1.

The algorithm includes the following steps:
1) Compute all possible configurations having m−1 spans that are valid under Min-Max starting from every hut and all the configurations having m−1 or less spans starting from $H_1$.
2) Using each such configuration $C_{i,j}=H_i \ldots H_j$, compute the optimal valid configuration (valid under Avg) from $H_1 \ldots H_j$ that includes $C_{i,j}$, for increasing values of i. The overall solution will result when $C_{i,j}$ includes the end hut. Now we look into each of the steps.

Denote by $L_i^x$ the set of configurations starting from $H_i$ and having x spans that are valid under Min-Max. For step 1, the required configurations are constructed in an iterative fashion. First, all possible single-span configurations ($L_i^1$) are computed starting at each hut $H_i$—these are essentially the segments between $H_i$ and the next amplifier hut. Now, $L_i^x$ can be constructed by taking each element, say $C_{i,j}$, from $L_i^{x-1}$, and combining it with the configurations from $L_j^1$.

For step 2, for each of the configuration $C_{i,j}$ in step 1, the algorithm keeps track of the optimal solution from $H_1 \ldots H_j$ that includes $C_{i,j}$ in a set $E_j$ (this is done with prev( ) field in the algorithm). The optimal solution to each configuration of the form $C_{1,j}$ is the configuration itself. For all other configurations $C_{j,k}$, valid configurations $H_1 \ldots H_k$, are constructed by taking the optimal solutions for $C_{i,j}$ from $E_j$ (which would have been already computed since i<j) and combining with $C_{j,k}$ if $C_{i,j}$ and $C_{j,k}$ can be combined under Avg. From the valid combinations, the cheapest solution is chosen for $H_1 \ldots H_k$ that contains $C_{j,k}$ and it is added to $E_k$. Since all the configurations in $E_j$ are m−1 spans long or start from $H_1$, we are guaranteed to find the optimal solution (from the observation).

FIG. 12 presents illustrative pseudo-code for Algorithm 4.

Let the number of valid spans (by taking care of both min_d and max_d constraints) starting from any hut be p. There are at most $p^{m-1}$ configurations in $L_i^{m-1}$ for each i=1 ... n−1. So is the case for $E_i$ for all i=2 ... n. Hence, the total number of m−1 span configurations generated is $O(np^{m-1})$. The dominating part in the algorithm is from the last outer for loop onwards. The check for the violation of Avg can be performed in O(m). Hence, the complexity of the algorithm is $O(np^{2(m-1)}m)$.

E. Bi-Directional Transmission System Design

So far, we have considered the transmission system in a single direction. For bi-directional traffic, two DWDM systems are laid side by side in opposite directions as shown in FIG. 1. One simple way of configuring the bi-directional transmission system is to solve the problem as two unidirectional problems. This approach could however end up placing an amplifier in one direction and a splice in the reverse direction in the same hut, which often incurs high operational costs. Hence, it is important to find a solution that places a splice in a hut in both directions or in neither.

We address the problem under two circumstances depending on whether the span losses are identical in both directions or not. When they are identical, we can simply solve the problem for the uni-directional case (say east-bound) and apply the resulting solution to the reverse direction by shifting the amplifiers by one amplifier hut west-ward. For example, consider three huts $H_1, H_2, H_3$ in the east-bound direction. Let us say the solution places amplifiers $A_j$ and $A_k$ at the huts $H_2$ and $H_3$ to account for the losses in the $H_1$-$H_2$ and $H_2$-$H_3$ spans, respectively. Then, in the reverse direction, we place $A_k$, in $H_2$ (to handle $H_3$-$H_2$) and $A_j$ in $H_1$, (to handle $H_2$-$H_1$).

Next, we consider the case where the span losses are not identical in the two directions, which may arise because of different fiber types. The algorithms given so far can be used to solve this problem, with the following modifications.

Take the distance in both directions into account. Specifically, any test involving $d_{i,j}$ case will now include $d_{j,i}$.

The cost of the amplifier $c_{i,j}$ will be the cost of the amplifiers for both $d_{i,j}$ and $d_{j,i}$.

For DP-Max_m only: compute the extra-loss spans in both the directions.

In the end, shift the amplifiers in the reverse directions by one amplifier hut as above.

V. Experiments

We conducted a large number of experiments to study the effectiveness of the various algorithms and constraints. We however only present a representative subset of the results here. First, we present the experiment testbed.

A. Testbed

We implemented the algorithms in Java and ran the experiments on a lightly loaded Sun Sparc Ultra-4 running Solaris 7. We ran the experiments on real-life topologies (i.e., hut distributions) as well as a wide range of synthetic topologies. We only present the results for a subset of them. The real network came from a U.S.-based carrier and is given in FIG. 13. It consisted of 20 huts and the span distances varied between 40 km and 100 km. We generated several synthetic topologies varying in the number of huts, with hut distances generated uniformly randomly between 40 km and 120 km. We used two fictitious classes of amplifiers. Amplifier $A_1$ could compensate for up to 100 km at a price of $440,000, and $A_2$ for up to 120 km at $490,000. Table II in FIG. 14 lists the various parameters used in the experiments. We use span distance as a measure of loss.

In addition to the techniques presented herein, we studied a set of exhaustive search algorithms, one per each constraint, for comparison purposes. These algorithms generate all possible valid configurations and then select the cheapest. The valid configurations are generated by first enumerating all sets of huts that are spliceable under the given constraint.

B. Running Times

Figures 14, 15:
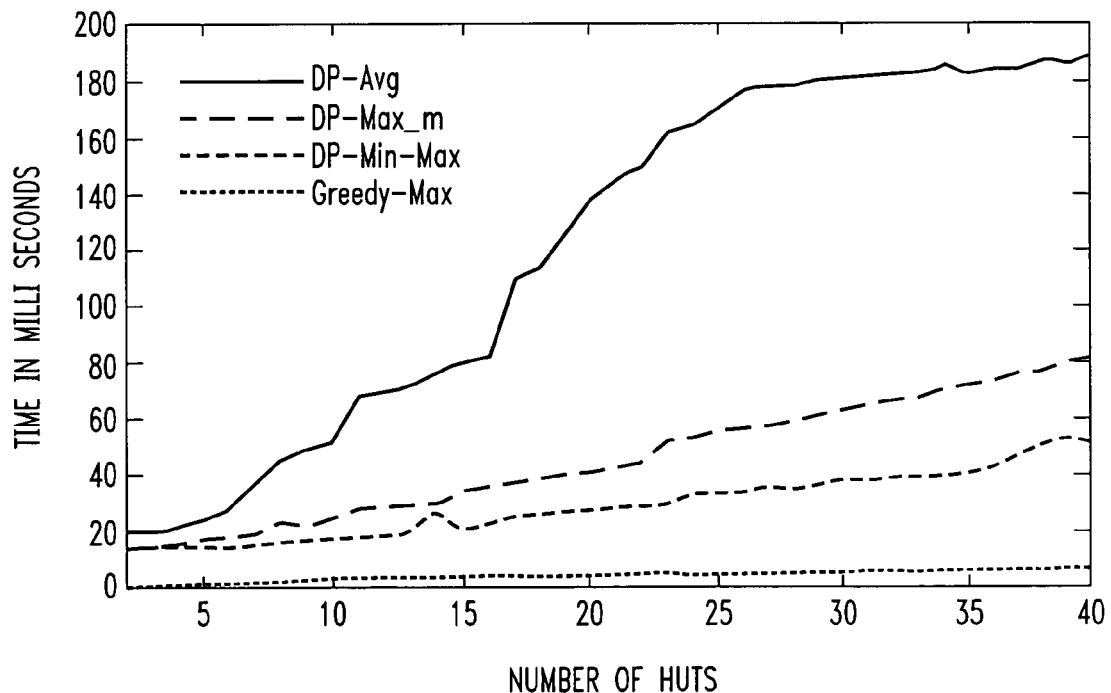

FIG. 15 shows the running times for the four algorithms for different number of huts in the synthetic topologies. The non-monotonicity in some portions was because the algorithms depend on the exact hut placement (not just the number of huts), which was randomly chosen. Note that the running time for DP-Avg is much higher than the others, reflecting its complexity. However, all the algorithms take less than 200 msec even for 40 nodes, making them highly efficient in practice.

Figure 16:
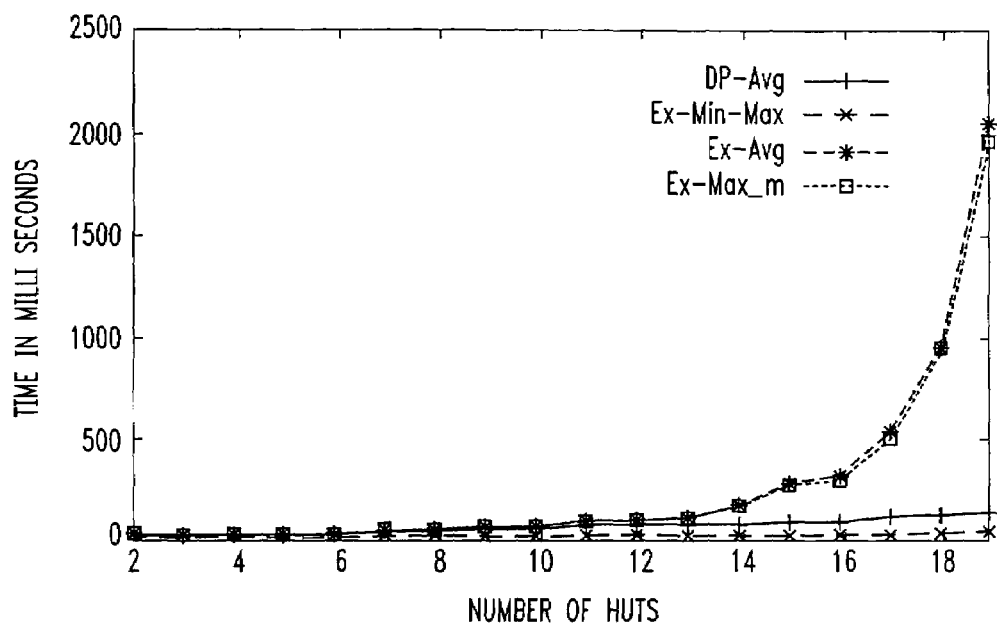

FIG. 16 compares the times for DP-Avg with the exhaustive algorithms. It clearly demonstrates the time savings resulting from our algorithms. Note that the exhaustive algorithm for Min-Max has low running times. This is because the exhaustive algorithm only generates spliceable huts and the synthetic distribution had very few spliceable huts in it.

C. Network Costs

Figure 17:
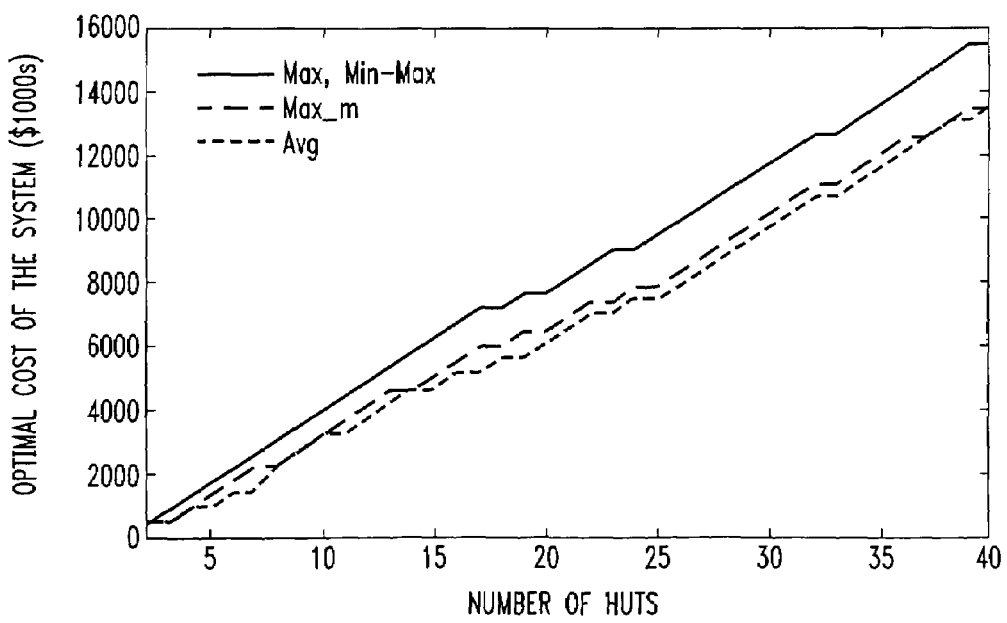

FIG. 17 shows the costs of the network designed under different constraints, as a function of the number of huts. The costs under both Max and Min-Max turned out to be identical due to the parameters chosen, though this is not universally true. More importantly, Max and Min-Max lead to higher dollar costs than the others, due to their stricter nature. It is interesting to note that, Max_m has higher cost than Avg. This is because Avg allowed up to 3 violations in 4 spans, whereas Max_m allowed only 1.

In contrast, for greenfield scenarios, Max_m allows longer reach than Avg for the same number of amplifiers and hence cheaper configurations. For example, using 4 amplifiers, Max_m, allows the following. span distances: 150, 120,120, 120,120,120, whereas Avg can only have: 120,120,120,120.

D. Effect of Constraint Parameters

In FIG. 18, we explore the effect of m on the costs of configurations under Max_m and Avg, for a network containing 30 huts. With the increase in m, the dollar cost of the network for Max_m constraint increases because it allows fewer extra-loss spans and hence more amplifiers overall. In contrast, with the increase in m, Avg allows more loss violations in the spans because the average is now computed over longer number of spans. This results in lower costs. For example, at m=1, Avg equals Min-Max, and at m=2, it uses the average over two spans, and so on.

Note that the cost in Avg is not monotonically increasing. This is a counter-intuitive property of Avg which some times allows more combinations for lower m. Here is an example: consider span losses of 2, 3, 3, 2, 3. Let avg_loss=4, max_loss=5. Then, for m=2, a valid configuration can combine the first two spans and the last two spans, resulting in totally 3 amplifiers. For m=3, we require at least 4 amplifiers because with three amplifiers the average of the resulting three spans would be 13/3, exceeding the avg_loss.

E. Real-Life Network

Figure 13:
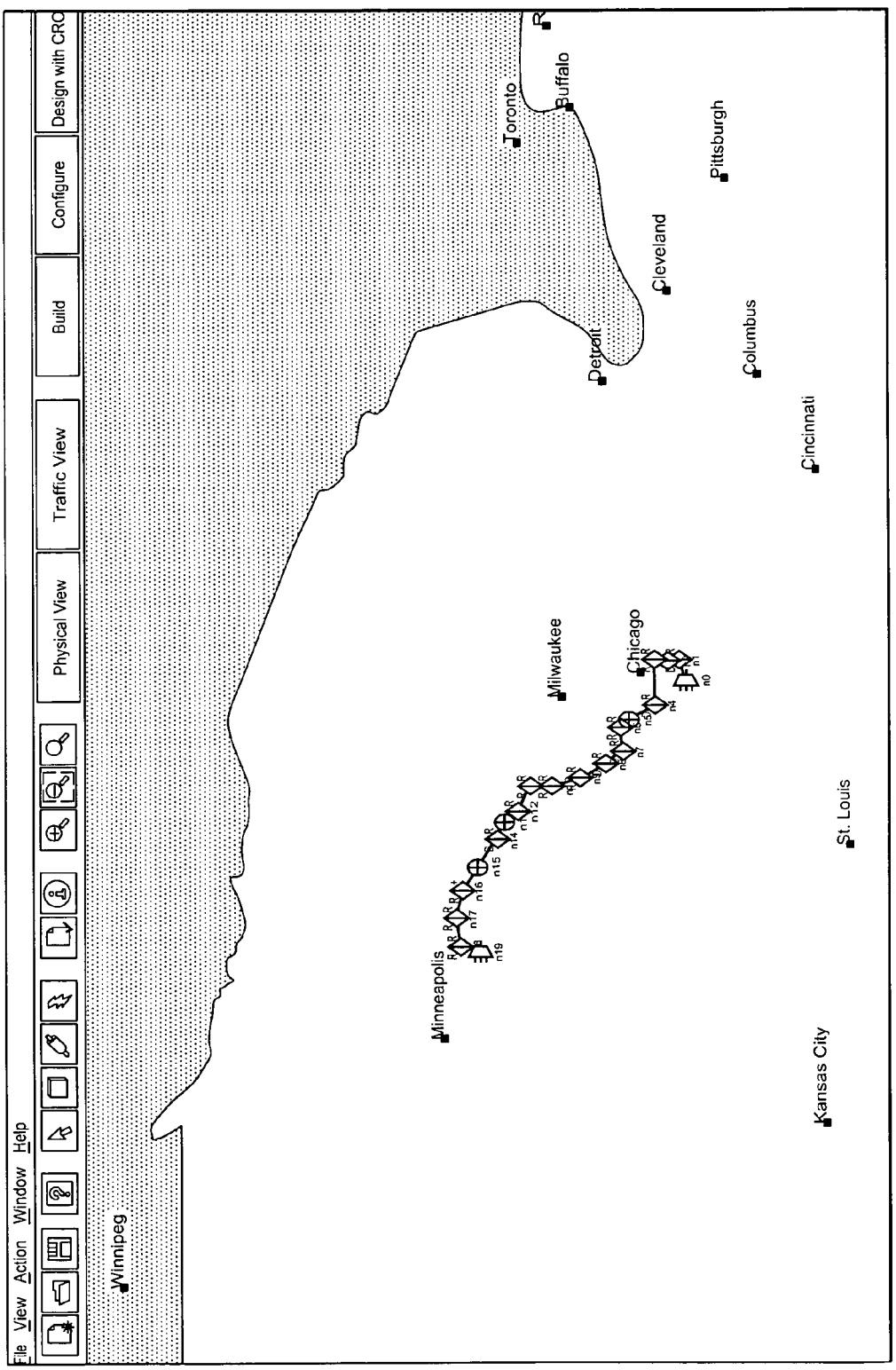

Here, we present the output of running a design over the real-life network in FIG. 13. We designed the network under all four constraints, and the corresponding costs and running times are shown in Table III of FIG. 19. Once again, we note that the Avg and Max_m constraints lead to lower costs, while taking higher but still tolerable design times, than the others.

F. Conclusions from Experiments

We summarize the results of the experiments below.
1) All the algorithms presented in this paper incur tolerably low running times, with DP-Avg taking longer time than DP-Max_m, followed by DP-Min-Max and Greedy-Max.
2) Almost always, Avg leads to cheaper configurations than Max_m followed by Min-Max and Max.
3) In a few cases, Avg may lead to higher costs for higher values of m.

VI. Other Design Issues

The algorithms presented in accordance with the present invention are preferably implemented as software used to design several real networks. A new set of issues arise during these real applications. In this section, we present some of them and comment on how our work addresses them.

Presence of optical add-drop multiplexers (OADMs): Most modern transmission systems include OADMs at locations where wavelengths have to be added or dropped. The OADM location will have an amplifier just like the destination end-terminal. The solution is to ignore the configurations generated during the algorithms that place a splice at any OADM location.

New Hut Construction: In the rare greenfield scenarios, where a carrier is laying an entirely new network, there is the additional possibility of constructing new huts. The design algorithms can then specify that an amplifier be placed in a new hut in order to handle high span losses. A naive extension of the algorithms to solve this problem would be to place hypothetical huts every kilometer (km) and in the end eliminate those containing splices. However, this approach is clearly inefficient for designing systems for thousands of km and more importantly it ignores the high costs of constructing new huts. We have devised the following algorithm to minimize the number of new huts for Max. Assuming that the amplifiers can compensate for at most d km, the algorithm places hypothetical huts at d km intervals starting from every existing hut and in the end eliminate those containing splices.

VII. Illustrative Hardware Implementation

Referring now to FIG. 20, a block diagram illustrates a generalized hardware architecture of a computer system suitable for implementing a design system for computing valid OTS configurations, according to an embodiment of the present invention. More particularly, it is to be appreciated that design system 500 in FIG. 5 may implement such a computing system 2000 to perform the algorithms (methodologies) of the invention. Also, one or more system components (e.g., in a network being designed) may implement such a computing system 2000. Of course, it is to be understood that the invention is not limited to any particular computing system implementation.

In this illustrative implementation, a processor 2010 for implementing at least a portion of the algorithms (methodologies) of the invention is operatively coupled to a memory 2020, input/output (I/O) devices 2030 and a network interface 2040 via a bus 2050, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide the design inputs used by a design system of the invention to generate design results. Alternatively, the design inputs could be read into the design system from a diskette or from some other source (e.g., another computer system) connected to the computer bus 2050. Also, inputs to the design methodologies may be obtained in accordance with the one or more input devices. The output devices may be one mechanism for a user or other computer system to be presented with results of the design methodologies.

Still further, the phrase "network interface" as used herein is intended to include, for example, one or more devices capable of allowing the computing system 2000 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of design systems, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the algorithms (methodologies) of the invention, as described herein, may be stored in one or more of the associated storage media (e.g., ROM, fixed or removable storage) and, when ready to be utilized, loaded in whole or in part (e.g., into RAM) and executed by the processor 2010.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

As has been explained above, modern optical transmission systems involve complex and expensive equipment that need to be deployed carefully to enable error-free signal propagation. In accordance with principles of the invention, we presented algorithms for the cost-optimal design of such systems. We addressed a practical problem by focusing on the constraint-based design approach taken in practice. We considered a range of constraints and presented efficient optimal algorithms for all of them. Our experiments show the efficiency of these algorithms and also illustrate the impact of the constraints on network costs. In particular, we conclude that flexible constraints like Avg and Max-m can have significant cost benefits in practice, with little penalty on design times.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of designing an optical transmission system, the method comprising the steps of:
obtaining a set of one or more demands and a set of optical transmission system elements wherein elements may be consecutively coupled via a span;
obtaining at least one constraint on the design of the optical transmission system, wherein the at least one constraint comprises a signal loss in a span should not exceed a given maximum signal loss and a span should be longer than a given minimum span length; and
computing via a processor a least-cost configuration for the optical transmission system based on at least a portion of the set of one or more demands and the set of one or more optical transmission system elements such that the at least one constraint is satisfied;
wherein the step of computing the least-cost configuration based on the at least one constraint further comprises traversing element locations from a source to a destination such that increasingly longer solutions are computed.

2. The method of claim 1, wherein, at each element location $H_j$, optimal solutions are computed from $H_1$ to $H_j$ under two cases: (a) assuming an amplifier is placed at $H_j$; and (b) assuming a splice is placed at $H_j$.

3. The method of claim 2, wherein, under case (a), a configuration is derived by considering all solutions up to $H_{j-1}$ with and without amplifiers at $H_{j-1}$ and adding an amplifier at $H_j$, and selecting the least-cost result.

4. The method of claim 2, wherein, under case (b), let $H_k$ be the last location before $H_j$ that has an amplifier, and extend solutions up to $H_{j-1}$ with and without amplifiers at $H_{j-1}$.

5. A method of designing an optical transmission system, the method comprising the steps of:
obtaining a set of one or more demands and a set of optical transmission system elements wherein elements may be consecutively coupled via a span;
obtaining at least one constraint on the design of the optical transmission system, wherein the at least one constraint comprises a signal loss in a span should not exceed a given first maximum signal loss and a span should be longer than a given minimum span length, however, at most one in m contiguous spans can have a loss up to a given second maximum signal loss, wherein the second maximum signal loss is greater than the first maximum signal loss; and
computing via a processor a least-cost configuration for the optical transmission system based on at least a portion of the set of one or more demands and the set of one or more optical transmission system elements such that the at least one constraint is satisfied;
wherein the step of computing the least-cost configuration based on the at least one constraint further comprises generating solutions for element locations $H_1 \ldots H_j$ from solutions for $H_1 \ldots H_{j-1}$ knowing the nearest extra loss span having a loss up to the given second maximum signal loss from $H_{j-1}$ in the latter.

6. The method of claim 5, when the nearest extra loss span is a given number of spans away, allow traversal of a longer distance in the span containing $H_j$.

7. A method of designing an optical transmission system, the method comprising the steps of:
obtaining a set of one or more demands and a set of optical transmission system elements wherein elements may be consecutively coupled via a span;
obtaining constraints on the design of the optical transmission system, wherein the constraints comprise: (i) a signal loss in a span should not exceed a given first maximum signal loss and a span should be longer than a given minimum span length, however, at most one in m contiguous spans can have a loss up to a given second maximum signal loss, wherein the second maximum signal loss is greater than the first maximum signal loss; and (ii) a signal loss in a span should not exceed a given maximum signal loss and a span should be longer than a given minimum span length, and an average span loss of any m consecutive spans should not exceed a given average loss, wherein the average loss is less than the given maximum signal loss; and
computing via a processor a least-cost configuration for the optical transmission system based on at least a portion of the set of one or more demands and the set of one or more optical transmission system elements such that the at least one constraint is satisfied;
wherein the step of computing the least-cost configuration based on constraint (ii) further comprises:
computing all possible configurations having m−1 spans that are valid under constraint (i) starting from every element location and all the configurations having m−1 or less spans starting from location $H_1$; and
using each such configuration $C_{i,j}$ equal to $H_i \ldots H_j$, computing an optimal configuration from locations $H_1 \ldots H_j$ that includes $C_{i,j}$, for increasing values of i;
wherein the overall solution results when $C_{i,j}$ includes the destination location.

8. A method of designing an optical transmission system, the method comprising the steps of:
obtaining a set of one or more demands and a set of optical transmission system elements wherein elements may be consecutively coupled via a span;
obtaining at least one constraint on the design of the optical transmission system, wherein the at least one constraint comprises one of: (i) a signal loss in a span should not exceed a given maximum signal loss; (ii) a signal loss in a span should not exceed a given maximum signal loss and a span should be longer than a given minimum span length; (iii) a signal loss in a span should not exceed a given first maximum signal loss and a span should be longer than a given minimum span length, however, at most one in m contiguous spans can have a loss up to a given second maximum signal loss, wherein the second maximum signal loss is greater than the first maximum signal loss; and (iv) a signal loss in a span should not exceed a given maximum signal loss and a span should be longer than a given minimum span length, and an average span loss of any m consecutive spans should not exceed a given average loss, wherein the average loss is less than the given maximum signal loss; and
computing via a processor a least-cost configuration for the optical transmission system based on at least a portion of the set of one or more demands and the set of one or more optical transmission system elements such that the at least one constraint is satisfied;
wherein the step of computing the least-cost configuration is bi-directionally solved when span losses are identical in both directions by computing a solution for the uni-directional case and applying the resulting solution to the reverse direction by shifting elements by one element location.

9. A method of designing an optical transmission system, the method comprising the steps of:
obtaining a set of one or more demands and a set of optical transmission system elements wherein elements may be consecutively coupled via a span;
obtaining at least one constraint on the design of the optical transmission system, wherein the at least one constraint comprises one of: (i) a signal loss in a span should not exceed a given maximum signal loss; (ii) a signal loss in a span should not exceed a given maximum signal loss and a span should be longer than a given minimum span length; (iii) a signal loss in a span should not exceed a given first maximum signal loss and a span should be longer than a given minimum span length, however, at most one in m contiguous spans can have a loss up to a given second maximum signal loss, wherein the second maximum signal loss is greater than the first maximum signal loss; and (iv) a signal loss in a span should not exceed a given maximum signal loss and a span should be longer than a given minimum span length, and an average span loss of any m consecutive spans should not exceed a given average loss, wherein the average loss is less than the given maximum signal loss; and
computing via a processor a least-cost configuration for the optical transmission system based on at least a portion of the set of one or more demands and the set of one or more optical transmission system elements such that the at least one constraint is satisfied;
wherein the step of computing the least-cost configuration is bi-directionally solved when span losses are not identical in both directions by at least one of: taking the distance in both directions into account; letting a cost of an element $c_{i,j}$ be the cost of the elements for both $d_{i,j}$ and $d_{j,i}$; computing extra loss spans in both directions; and, at the end of the computation, shifting the elements in the reverse direction by one element location.

10. A method of designing an optical transmission system, the method comprising the steps of:
obtaining a set of one or more demands and a set of optical transmission system elements wherein elements may be consecutively coupled via a span;
obtaining at least one constraint on the design of the optical transmission system, wherein the at least one constraint comprises one of: (i) a signal loss in a span should not exceed a given maximum signal loss; (ii) a signal loss in a span should not exceed a given maximum signal loss and a span should be longer than a given minimum span length; (iii) a signal loss in a span should not exceed a given first maximum signal loss and a span should be longer than a given minimum span length, however, at most one in m contiguous spans can have a loss up to a given second maximum signal loss, wherein the second maximum signal loss is greater than the first maximum signal loss; and (iv) a signal loss in a span should not exceed a given maximum signal loss and a span should be longer than a given minimum span length, and an average span loss of any m consecutive spans should not exceed a given average loss, wherein the average loss is less than the given maximum signal loss; and
computing via a processor a least-cost configuration for the optical transmission system based on at least a portion of the set of one or more demands and the set of one or more optical transmission system elements such that the at least one constraint is satisfied;
wherein the step of computing the least-cost configuration further comprises ignoring computed configurations that place a splice at an optical add-drop multiplexer location.

11. A method of designing an optical transmission system, the method comprising the steps of:
obtaining a set of one or more demands and a set of optical transmission system elements wherein elements may be consecutively coupled via a span;
obtaining at least one constraint on the design of the optical transmission system, wherein the at least one constraint comprises one of: (i) a signal loss in a span should not exceed a given maximum signal loss and a span should be longer than a given minimum span length; (ii) a signal loss in a span should not exceed a given first maximum signal loss and a span should be longer than a given minimum span length, however, at most one in m contiguous spans can have a loss up to a given second maximum signal loss, wherein the second maximum signal loss is greater than the first maximum signal loss; and (iii) a signal loss in a span should not exceed a given maximum signal loss and a span should be longer than a given minimum span length, and an average span loss of any m consecutive spans should not exceed a given average loss, wherein the average loss is less than the given maximum signal loss; and computing via a processor a least-cost configuration for the optical transmission system based on at least a portion of the set of one or more demands and the set of one or more optical transmission system elements such that the at least one constraint is satisfied;

wherein the step of computing the least-cost configuration further comprises constructing a new element location.

12. A method of designing an optical transmission system, the method comprising the steps of:

obtaining a set of one or more demands and a set of optical transmission system elements wherein elements may be consecutively coupled via a span;

obtaining at least one constraint on the design of the optical transmission system, wherein the at least one constraint comprises one of: (i) a signal loss in a span should not exceed a given maximum signal loss; (ii) a signal loss in a span should not exceed a given maximum signal loss and a span should be longer than a given minimum span length; (iii) a signal loss in a span should not exceed a given first maximum signal loss and a span should be longer than a given minimum span length, however, at most one in m contiguous spans can have a loss up to a given second maximum signal loss, wherein the second maximum signal loss is greater than the first maximum signal loss; and (iv) a signal loss in a span should not exceed a given maximum signal loss and a span should be longer than a given minimum span length, and an average span loss of any m consecutive spans should not exceed a given average loss, wherein the average loss is less than the given maximum signal loss; and computing via a processor a least-cost configuration for the optical transmission system based on at least a portion of the set of one or more demands and the set of one or more optical transmission system elements such that the at least one constraint is satisfied;

wherein the step of computing the least-cost configuration further comprises constructing a new element location; and wherein the step of constructing a new element location further comprises placing hypothetical locations at d kilometer intervals starting from every existing location and, at the end of the computation, eliminating those locations containing splices.

13. Apparatus for designing an optical transmission system, comprising:

a memory; and at least one processor coupled to the memory and operative to:

obtain a set of one or more demands and a set of optical transmission system elements wherein elements may be consecutively coupled via a span;

obtain at least one constraint on the design of the optical transmission system, wherein the at least one constraint comprises a signal loss in a span should not exceed a given maximum signal loss and a span should be longer than a given minimum span length; and compute a least-cost configuration for the optical transmission system based on at least a portion of the set of one or more demands and the set of one or more optical transmission system elements such that the at least one constraint is satisfied;

wherein the operation of computing the least-cost configuration based on the at least one constraint further comprises traversing element locations from a source to a destination such that increasingly longer solutions are computed.

14. An article of manufacture for designing an optical transmission system, comprising a computer readable storage medium containing one or more programs which when executed implement the steps of:

obtaining a set of one or more demands and a set of optical transmission system elements wherein elements may be consecutively coupled via a span;

obtaining at least one constraint on the design of the optical transmission system, wherein the at least one constraint comprises a signal loss in a span should not exceed a given maximum signal loss and a span should be longer than a given minimum span length; and computing a least-cost configuration for the optical transmission system based on at least a portion of the set of one or more demands and the set of one or more optical transmission system elements such that the at least one constraint is satisfied;

wherein the step of computing the least-cost configuration based on the at least one constraint further comprises traversing element locations from a source to a destination such that increasingly longer solutions are computed.

* * * * *